United States Patent [19]

Becker et al.

[11] Patent Number: 5,351,828
[45] Date of Patent: Oct. 4, 1994

[54] INFLATABLE FOIL SACHET, ESPECIALLY FOR PACKAGING PURPOSES

[76] Inventors: Rolf Becker; Wolfram Becker, both of Schlob Stetten, D-7118 Kunzelsau, Fed. Rep. of Germany

[21] Appl. No.: 118,950

[22] PCT Filed: Jul. 11, 1990

[86] PCT No.: PCT/DE90/00516
§ 371 Date: Feb. 28, 1992
§ 102(e) Date: Feb. 28, 1992

[87] PCT Pub. No.: WO91/00834
PCT Pub. Date: Jan. 24, 1991

Related U.S. Application Data

[63] Continuation of Ser. No. 807,848, Feb. 28, 1992, abandoned.

[30] Foreign Application Priority Data

Jul. 11, 1989 [DE] Fed. Rep. of Germany ....... 3922802

[51] Int. Cl.5 .................................... B65D 33/24
[52] U.S. Cl. ........................ 206/522; 383/3; 383/44; 383/58
[58] Field of Search ........................ 428/12; 410/119; 206/522; 383/3, 44, 58, 100, 103; 5/455, 456; 156/145

[56] References Cited

U.S. PATENT DOCUMENTS

| | | | |
|---|---|---|---|
| 2,595,708 | 5/1952 | Salfisberg | 383/100 |
| 3,180,558 | 4/1965 | Quaadgras et al. | 383/58 |
| 3,207,420 | 9/1965 | Navorrete-Kindelan | 383/103 |
| 3,311,287 | 3/1967 | Long et al. | 383/100 |
| 3,313,472 | 4/1967 | Tjerneld et al. | 383/44 |
| 4,076,872 | 2/1978 | Lewicki et al. | 428/12 |
| 4,550,441 | 10/1985 | Keppel | 383/103 |

FOREIGN PATENT DOCUMENTS

| | | | |
|---|---|---|---|
| 2291114 | 11/1976 | France . | |
| 8806131 | 8/1988 | PCT Int'l Appl. | 383/3 |
| 407866 | 9/1966 | Switzerland . | |
| 909977 | 11/1962 | United Kingdom . | |
| 1021167 | 3/1966 | United Kingdom | 383/58 |
| 1035248 | 7/1966 | United Kingdom . | |

*Primary Examiner*—Stephen P. Garbe
*Attorney, Agent, or Firm*—Davis, Bujold & Streck, P.A.

[57] ABSTRACT

The invention relates to a foil sachet (1) with at least one chamber (7) consisting of an upper and lower foil (2, 3) secured together by a closed seam (5, 6). In order to fill the chambers (7) with a substance, especially air, there is a channel (10, 14) having channel sections (14) opening in the region of a seam (5, 6) and preferably in the region of the corner of the chamber concerned where there is an aperture in said chamber. There are preferably a main (10) and a subsidiary channel (14), wherein the main channel may also run outside the foil sachet (1).

19 Claims, 6 Drawing Sheets

INFLATABLE FOIL SACHET, ESPECIALLY FOR PACKAGING PURPOSES

This is a continuation of copending application Ser. No. 07/807,848 filed on Feb. 28, 1992, now abandoned.

DE-A 37 05 167 discloses a film bag made of thin plastic film having at least one chamber consisting of an upper and a lower film interconnected by a closed-line seam. A narrow tube having small dimensions compared to the chamber and likewise consisting of a thin film extends through all chambers of the film bag, remaining permeable for a filling medium, generally air, at the points of passage into the chamber at the seams. The tube itself has openings, e.g. perforations, through which air enters the chamber when the bag is filled. When the chamber is filled the film tube is compressed by the internal pressure in the chamber so that the openings automatically close.

The seams interconnecting the upper and lower films are preferably weld seams, whereby only the outer walls of the tube are welded to the films at the points of passage of the tube during the welding process while the film tube remains permeable to air at these points of passage. This can be effected by preparing the film tube in such a way that its inner walls are moistened e.g. with a medium which prevents such a welding, or by an additional thermal film within the tube which has a higher melting point than the material of the outer wall of the tube.

Further prior art is French patent no. 2.067.530 and French patent application no. 2.291.114.

A problem of known film bags is their proper closure, in particular when strong long-lasting forces or strong shock-like forces act on the bag. With conventional constructions at least part of the air in the foil bags can flow out, thereby reducing the packaging effect with respect to reliable holding and protection of the object. Also, their production is frequently complicated.

The invention is based on the problem of stating a film bag of the type in question whose production is simplified and which reliably prevents the filling medium, i.e. air, from flowing out under virtually all operating conditions.

This is achieved when the channel has portions connected with the chamber film which are situated near a seam in each chamber, and the openings into the chambers are provided there. The channel portions with the openings are preferably situated in the area of the corners of the chambers. They are therefore located in areas where the strongest curves and the most bends and folds, which repeatedly bend the channel, occur in the inflated film bag, so that the sealing effect is excellent.

It is particularly advantageous if the film bag is formed in such a way that the channel is divided into a main channel and a side channel branching off the main channel, whereby the side channel is directed into the corner of a chamber and the opening into the chamber is provided there. At least the side channel is in turn connected with the chamber film. The side channel and main channel can be formed e.g. with the aid of a film strip which is connected with a chamber film e.g. by welding.

Since the openings from the channel into the chambers are preferably situated in the chamber corners, the channel arrangement is located along the edge of the film bag, the main channel being disposed outside the longitudinally extending edge seam of the chambers when the channel arrangement is separated into a main channel and a side channel. This particularly ensures a uniform filling of the chambers even if a plurality of them are arranged in a row. Furthermore, it makes it possible to dispose a film bag on each side of the main channel, so that film bags with a plurality of chambers can be produced whereby the bags are simultaneously very flexible and can be well adapted in shape to the object to be packaged and protected.

Further embodiments of the invention can be found in the subclaims. The invention will be explained in more detail in embodiment examples with reference to the drawing, in which:

Figure 1:
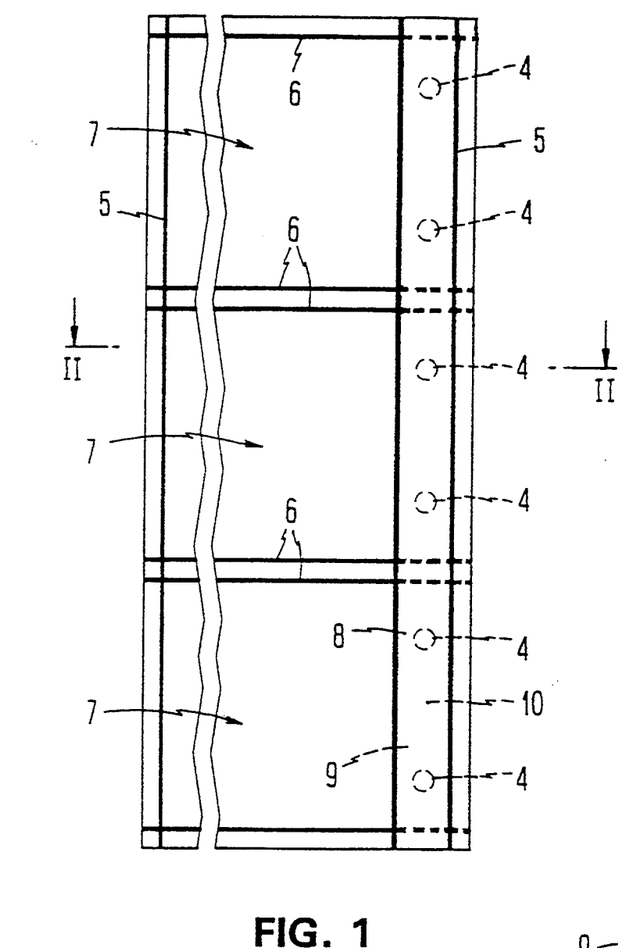
FIG. 1 shows a schematic top view of a film bag according to the invention having three chambers and a film strip stuck on the outside of the film bag for forming a channel.
Figure 2:
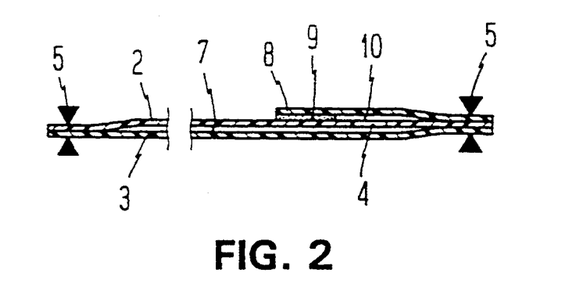
FIG. 2 shows a section along II—II in FIG. 1.

A film bag 1 according to FIG. 1 has an upper film 2 and a lower film 3 both made e.g. of polyethylene. Along a row, at the edge of the film sheets, openings 4 are pierced in upper film 2. The two films are placed one on the other according to FIG. 2 and divided into three chambers 7 sealed from one another by longitudinal weld seams 5 at the edges and transverse weld seams 6. Between adjacent chambers there are two parallel transverse weld seams 6 in each case, so that the bag can be bent at these points without obstruction. Openings 4 are located in each case in or between the corners of chambers 7. Over the total length of the film bag in the area of the openings there extends a strip-shaped film 8 which is glued on e.g. with the aid of an adhesive 9, whereby adhesive 9 is applied only at the longitudinal edges as indicated in FIG. 2. The film strip may also be welded along its edges to the upper film as indicated on the right in FIG. 2. In an area above openings 4, films 2 and film strip 8 are thus not interconnected, leaving a channel 10 which extends over the total length of the film bag. In one end of this channel one can insert e.g. an inflating rod which is connected to a compressor. When the other end of the channel is closed and the compressor switched on, air flows through openings 4 into chambers 7 of the film bag which thereby swell up in a cushion shape. When chambers 7 are sufficiently filled the compressor is switched off. The internal pressure in the bag presses upper film 2 against strip-shaped film 8 and seals channel 10 from the outside. The sealing effect is further increased by openings 4 being located in an area where the film bag is highly deformed and curved by the inflation and therefore has folds and bends which additionally block channel 10. The seal is maintained even if there are high pressures on the bag. The sealing effect is lower the further away main channel 10 is from weld seam 5.

At the points where the film strip passes through the transverse weld seams one must then make sure the channel remains permeable for the inflating air.

Figure 3:
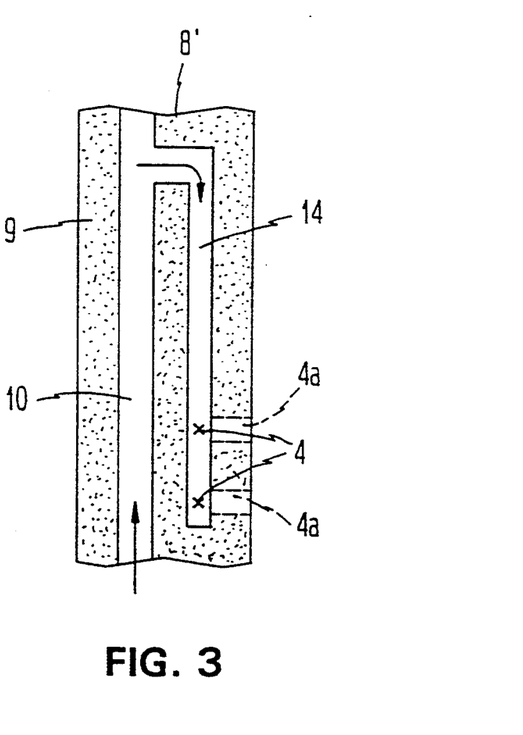
FIG. 3 shows a top view of part of a film strip for forming a main channel and a side channel.

FIG. 3 shows a section of a film strip 8' in the area of a chamber 7 which is connected with one of the chamber films, here by an adhesive 9, in accordance with the above embodiment example. Adhesive 9 is applied in such a way that a channel pattern consisting of a main channel 10 extending in the longitudinal direction of film strip 8' and a side channel 14 branching off the main channel and runs parallel thereto to connect for each chamber. Side channel 14 is disposed in such a way that when the film bag is inflated, indicated by the arrow in main channel 10, the air flows in the opposite direction in side channel 14. At the places indicated by crosses at the end of side channel 14, openings 4 to the chamber are provided which are disposed in the corner of the particular chamber as above. If the film strip is applied to the lower film within the chamber, branch channels 4a extending from side channel 14 to the edge of film strip 8' can also be provided, as indicated by broken lines in FIG. 3, in the area of which the film strip is not connected with the lower film. The air then passes into chambers 7 through these branch channels or openings 4a. Such a channel pattern between the film strips and one of the chamber films can of course also be produced by accordingly disposed weld seams.

Figure 4A:
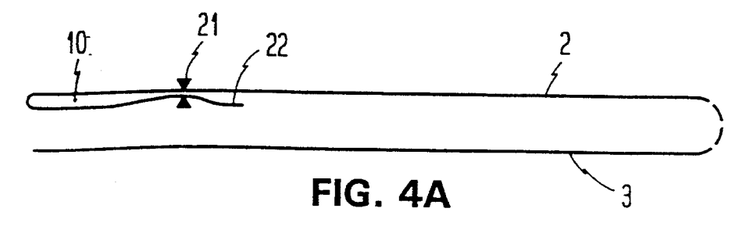
FIGS. 4a to 4e each show schematic representations of individual method steps during production of a film bag.
Figure 4B:
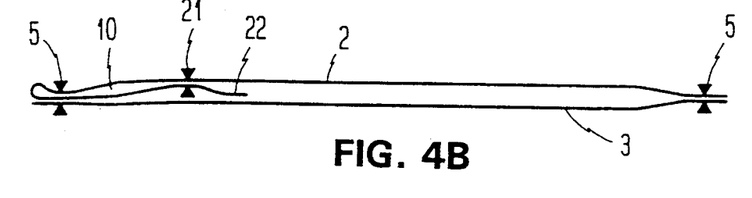
Figure 4C:
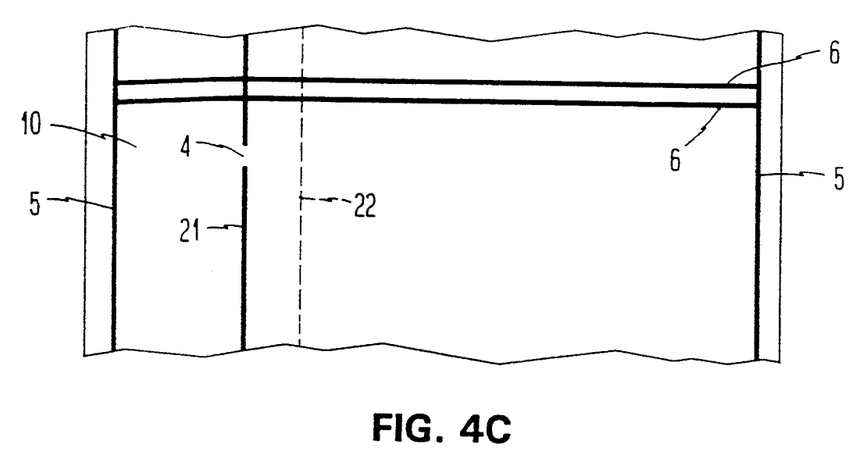
Figures 4D, 4E:
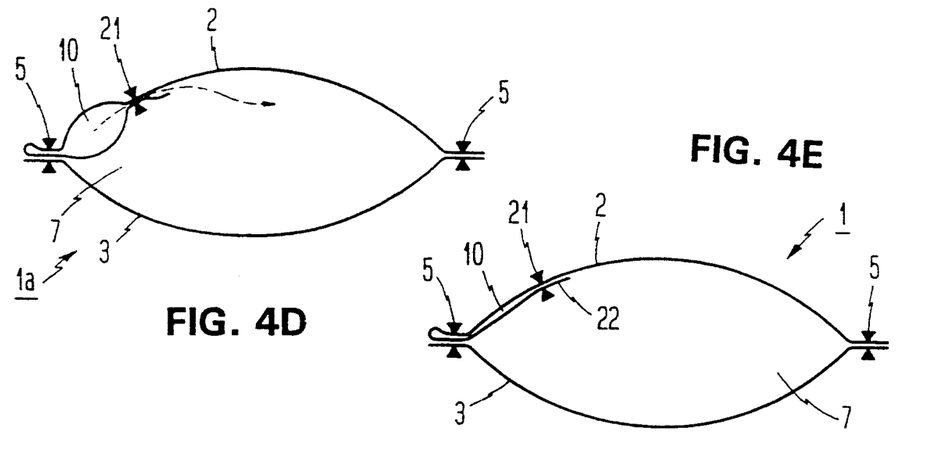

FIGS. 4a to 4e show representations for the production of a modified film bag 1. Upper film 2 is turned over along its longitudinal edge and welded along the edge of the turned over part with a longitudinal seam 21, thereby forming channel 10. Longitudinal seam 21 is interrupted at intervals so that openings 4 to chambers 7 are later located there, as shown in FIG. 4c, coming to lie between the chamber corners. According to FIG. 4a, a flap 22 of the turned over part of upper film 2 still remains beside weld seam 21. Upper film 2 is then placed on lower film 3 as in FIG. 4b and welded to lower film 3 with longitudinal seams 5 and transverse seams 6. Left longitudinal weld seam 5 thereby interconnects lower film 3, the turned over part of upper film 2 and the latter itself. When welding transverse seams 6 one must again make sure channel 10 remains permeable at the points of passage.

This results in a film bag whose channel 10 is located on the left edge. When air is pressed into channel 10 it passes via openings 4 into chambers 7 of the bag; cf. FIG. 4d. After the end of the inflation process, channel 10 is automatically closed in accordance with FIG. 4e. The arrangement of channel 10 in the edge area of the film bag again has the advantage that the curves are greatest there when the chambers are inflated so that a sealing effect arises.

In this embodiment example it is also possible to employ only one film instead of an upper and lower film 2, 3. This single film is then turned over, as indicated by broken lines in FIG. 4a, and welded with its outer edge in the area of channel 10 to the films thereof. Longitudinal seam 5 shown on the right in FIGS. 4b to 4e is then omitted.

Figures 5A, 5B, 6A, 6B:
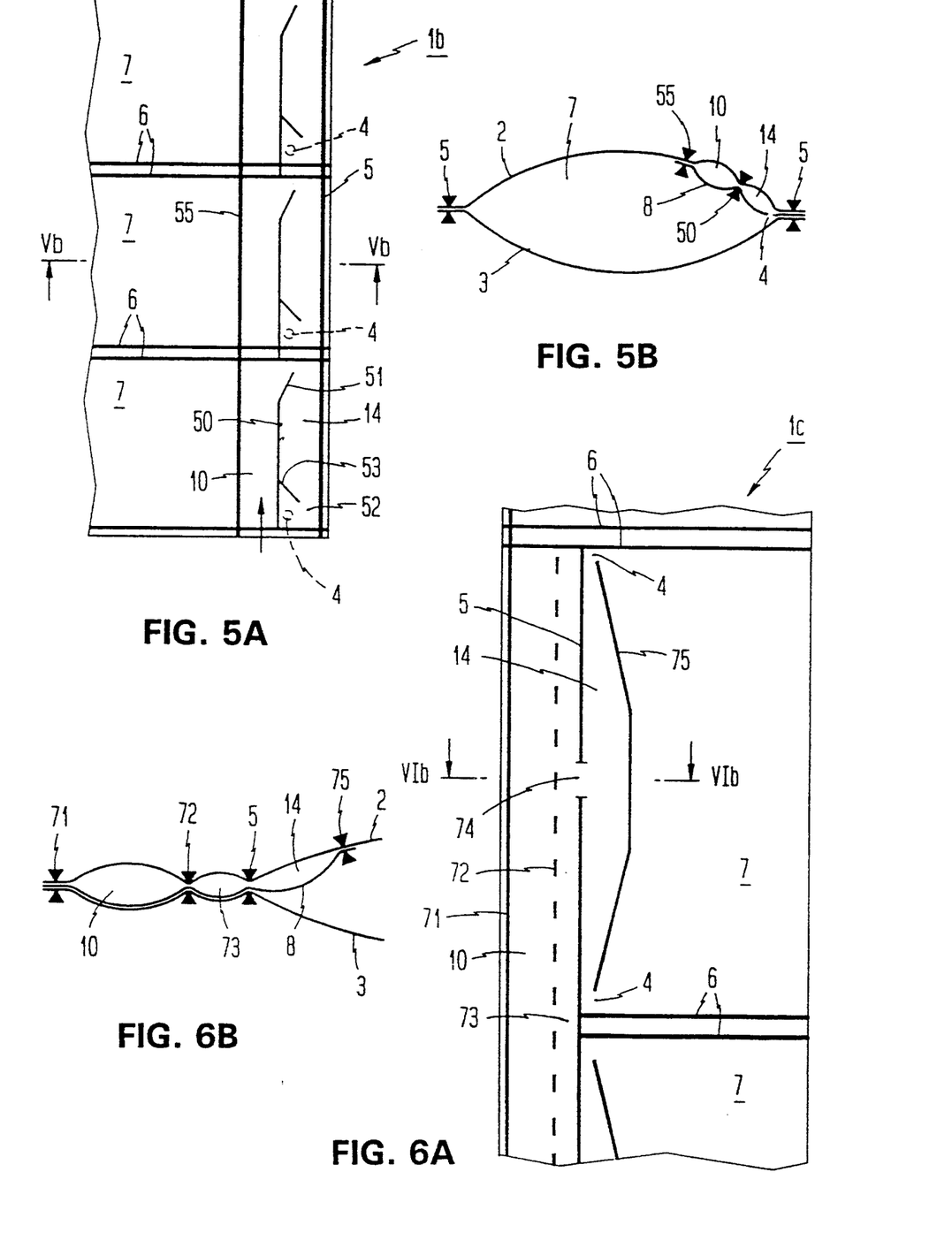
FIGS. 5a, 5b and 6a, 6b and 7a, 7b each show top views of part of a film bag and partial sections through the bag, respectively.

FIGS. 5a and 5b show a modified film bag 1b with three chambers 7. To inflate the chambers a main channel 10 running through all chambers 7 is provided from which a parallel side channel 14 separated by a weld seam 50 branches off in each chamber. The channel arrangement is located along the edge of the film bag. Main channel 10, which is closed on one side by a continuous longitudinal weld seam 55, remains permeable at the points of passage through transverse seams 6 between the individual chambers, while side channels 14 are closed there. Main channel 10 is broadened at its points of passage at transverse seams 6 by a kind of sluice 51 in each case, which leads into the side channel and is formed by slanting weld seam 50. When air is introduced into main channel 10 as indicated by the arrow, it passes into the side channel and finally arrives at opening 4 in the corner of the film bag directly beside the blowing-in point. Shortly before opening 4 a constriction 52 can also be provided in the side channel, which is produced e.g. by an oblique weld seam 53. This increases the sealing effect since the greatest fold caused by the closing of the channel arises near to or in the corner. The bag is produced with an upper film 2, a lower film 3 and a film strip 8 within the area of which the channels are provided. All three films are interconnected on the outside at the edge by the weld seam, film strip 8 is connected by weld seams 50 and 55 with one of the chamber films, in this case upper film 2. It is also possible to prefabricate the channel arrangement by accordingly welding two film strips and then welding upper and lower films 2, 3 to a longitudinal edge of the prefabricated channel arrangement in each case.

FIGS. 6a and 6b show a further film bag 1c with a plurality of chambers 7. One sees longitudinal weld seams 5 limiting chambers 7 and transverse weld seams 6. Beyond longitudinal weld seam 5 on the left in this case, a main channel extends which is limited at the edge by a longitudinal weld seam 71. Main channel 10 is again divided by an interrupted longitudinal weld seam 72, forming an intermediate channel 73 between main channel 10 and longitudinal weld seam 5. Longitudinal weld seam 5 has an opening 74 so that air from the intermediate channel can flow there into a side channel 14 located in the film bag. Side channel 14 is limited by a longitudinal weld seam 75 which approaches the chamber corners so that small connecting openings 4 arise here between side channel 14 and chamber 7.

FIG. 6b indicates that the film bag is formed in the channel area of upper film 2, lower film 3 and a film strip 8, the film strip being placed between the two films and welded thereto as described above.

Figure 7A:
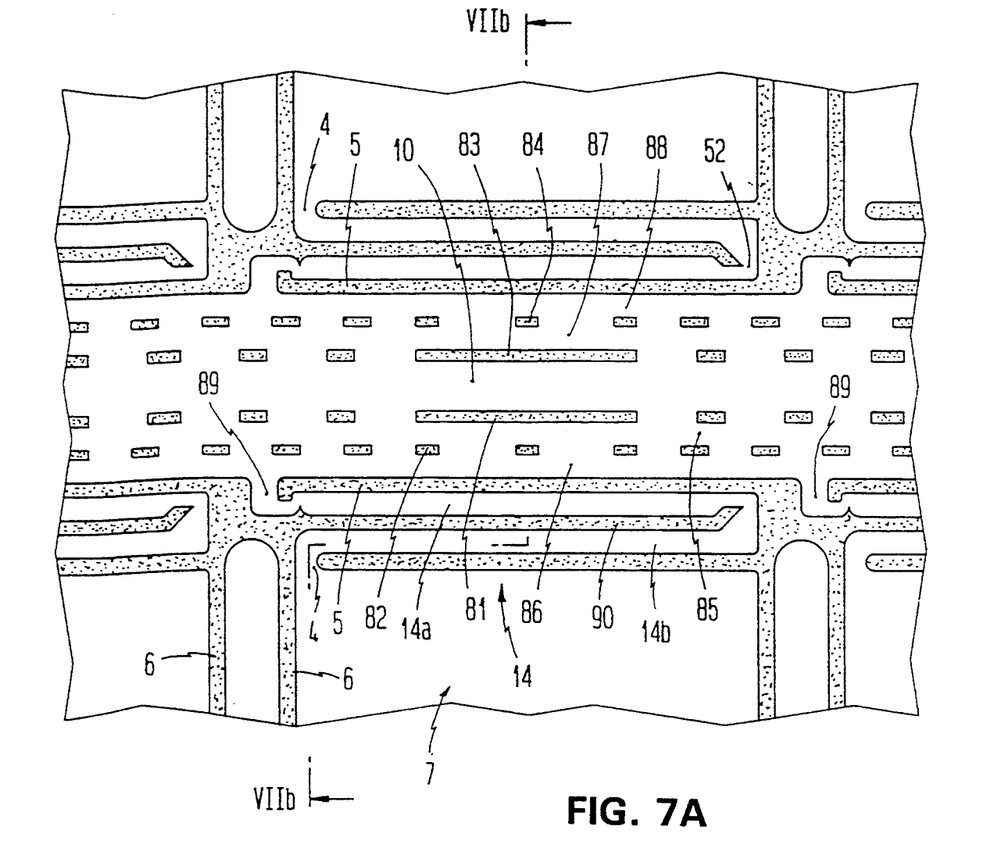
Figure 7B:
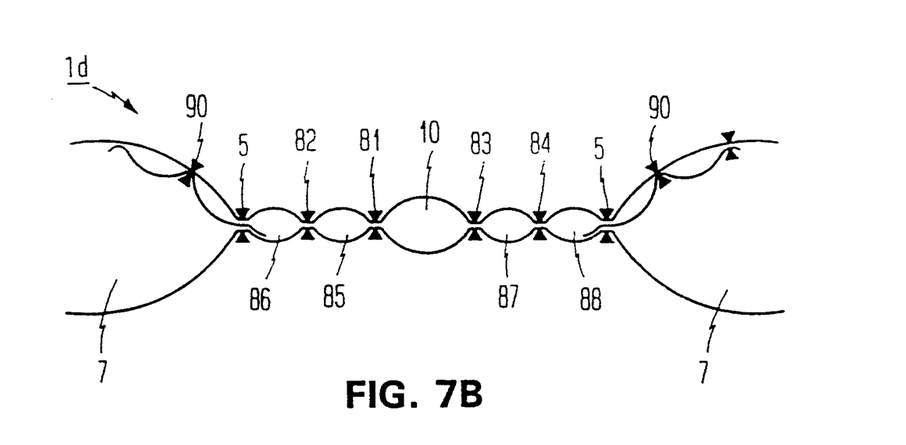

FIGS. 7a and 7b show a double bag 1d consisting of two film bags interconnected by the channel arrangement. The channel arrangement consists of a central main channel 10 connected on each side with intermediate channels 85, 86 and 87, 88 separated from each other by interrupted longitudinal weld seams 81, 82, 83 and 84. In the area of transverse weld seams 6, longitudinal weld seams 5 of the film bag are interrupted, giving rise to a connection 89 to a side channel 14. Side channel 14 comprises two channels 14a and 14b separated from each other by a weld seam 90 and interconnected by a constriction 52 in one corner of chamber 7. At the end of channel 14b the opening into the chambers is again provided in the channel corner, so that this opening 4 is approximately opposite entrance port 89. The air which is blown into main channel 10 and evenly distributed thereby over intermediate channels 85 to 88 is guided into the chamber in channels 14a and 14b in a loop which in this case leads over the total chamber length.

Figure 8:
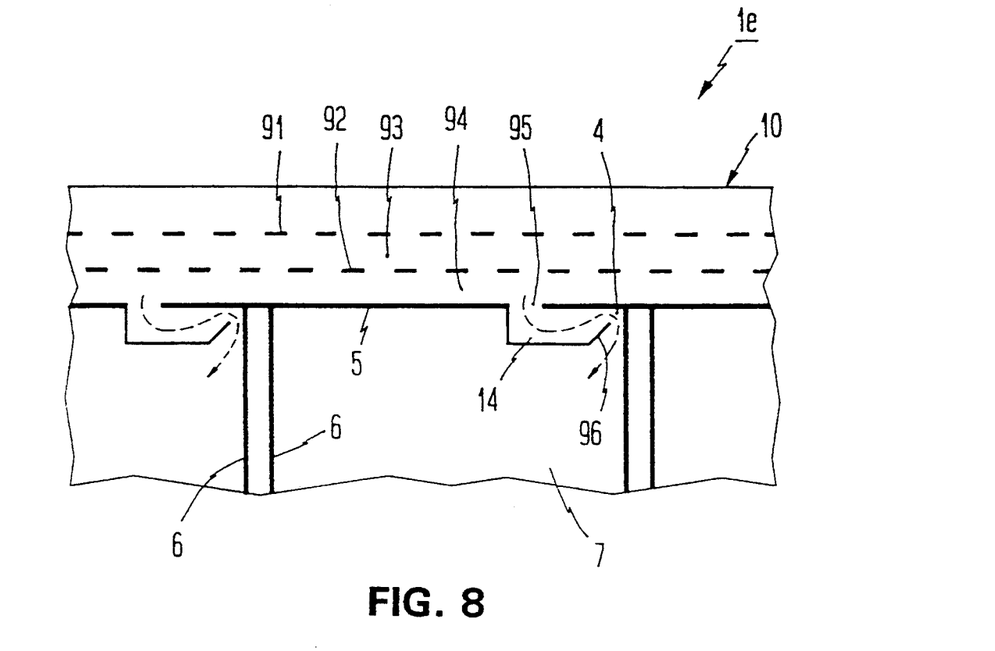
FIGS. 8 to 10 each show schematic representations of film bags.

FIG. 8 shows the top view of part of a film bag 1e. Here, too, main channel 10 is located outside the chambers parallel to their longitudinal weld seam 5. The main channel is divided by interrupted weld seams 91 and 92 as in the above embodiment example, resulting in intermediate channels 93 and 94 extending toward the edge of the chambers. Longitudinal weld seam 5 is again interrupted, forming an admission port 95 from intermediate channel 94 into chamber 7. From this admission port 95, a short side channel 14 is directed toward the channel corner, this side channel 14 being constricted at its end in the area of the channel corner by an oblique weld seam 96, forming a narrow opening 4 into chamber 7 there. When the film bag is inflated one or more folds form there which reliably seal side channel 14 from the outside.

Figure 9:
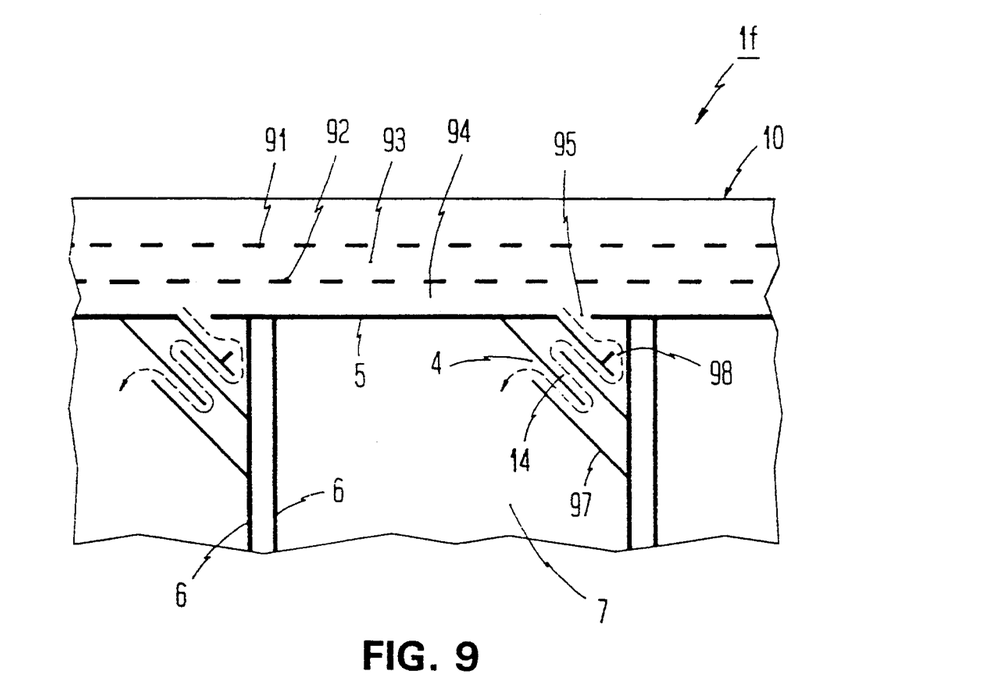

FIG. 9 shows a film bag 1f whose main channel is constructed as in the embodiment example of FIG. 8 and accordingly has two intermediate channels 93 and 94. The longitudinal seam limiting chambers 7 is interrupted in the area of one corner, giving rise to an admission port 95. From this admission port 95 a side channel 14 extends in a meander shape, being formed by meshing weld seams 97. At the beginning of channel 14 there is a constriction 98, and opening 4 into the interior of the chamber is provided at the end of this channel in the vicinity of the corner. In this embodiment example one clearly sees that when the film bag is inflated the cushion-like deformation of the chambers in the area of side channel 14 deforms, bends and folds the bag to such an extent as to ensure reliable closure of side channel 14.

Figure 10:
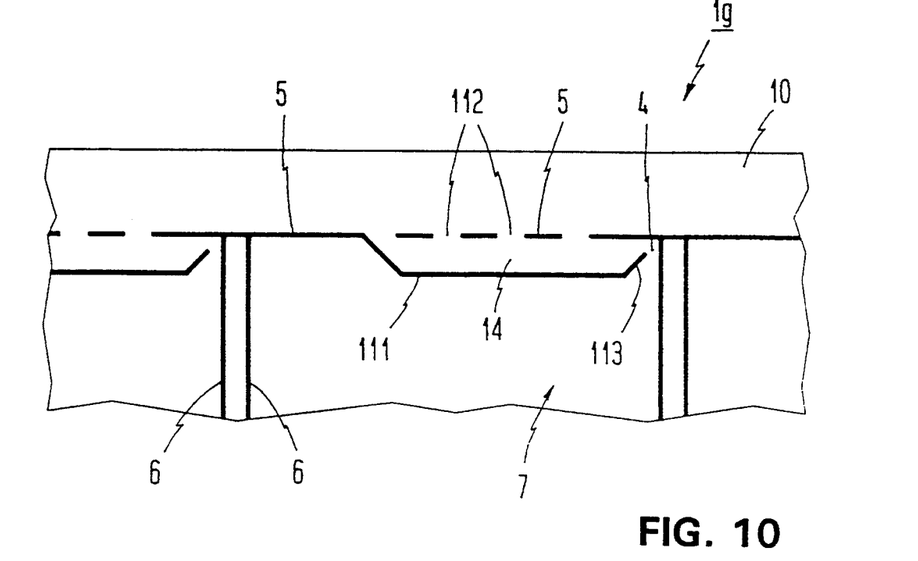

FIG. 10 shows part of a film bag 1g which has a main channel 10 situated outside the chamber parallel to longitudinal seam 5. As in the embodiment example of FIG. 8, a side channel 14 limited by a longitudinal seam 111 is located in the area of the chambers on the other side of longitudinal seam 5. Longitudinal seam 5 of the film bag is interrupted at several places in the area of side channel 14 so that entrance points 112 into side channel 14 exist here. Side channel 14 is again directed into a corner of the chamber and has a constriction formed by an oblique seam 113 there. Opening 4 of side channel 14 into chamber 7 is also located there. This embodiment requires low welding energy since only it is limited to the most necessary weld seams.

Figure 11A:
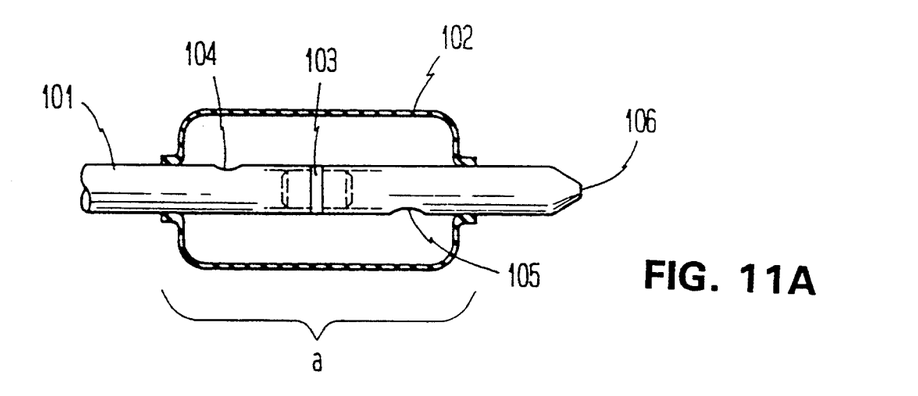
FIGS. 11a and 11b show schematic representations of a rod for inflating film bags.
Figure 11B:
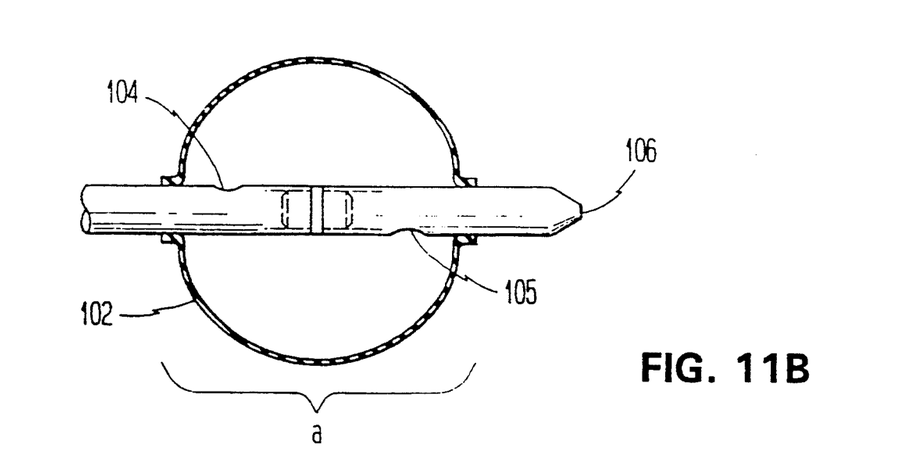

FIGS. 11a and 11b show the front end of a metal inflating rod 101. Shortly before the end of the inflating rod there is a rubber casing 102 in area a which is firmly connected with the rod on either side. In the middle of area a the rod is made impermeable to air e.g. by a partition 103. In front of and behind this partition 103 openings 104 and 105 are bored into the rod, whereby opening 105 is larger than opening 104. Exit point 106 at the tip of the rod is continuously adjustable.

When the air flows through rod 101 it exits through opening 104, inflates rubber casing 102 and passes through opening 105 into the rod again to escape through outlet opening 106. Depending on the adjustment of outlet opening 106, the inflated area, i.e. the volume of rubber casing 102, is large or small. Inflating rod 101 is inserted with its conical front end into main channel 10 of a film bag.

We claim:

1. An inflatable film bag for packaging purposes comprising:

first and second elongate film portions, one overlying the other, defining a longitudinal direction and a transverse direction, at least one longitudinal edge of said first and second film portions being interconnected with one another by a first longitudinal seam, said first and second elongate film portions having a plurality of transverse seams which, with said first longitudinal seam, define a plurality of substantially rectangular inflatable chambers formed between said first and second film portions and sequentially arranged along said inflatable film bag in the longitudinal direction, a fluid supply channel extending in the longitudinal direction, along the entire length of said inflatable film bag and located adjacent said first longitudinal seam, for inflating said plurality of chambers of said film bag with a medium, each of said plurality of chambers having at least one fill opening communicating with said supply channel to allow the medium to enter into each of said plurality of chambers, and each said filling opening automatically closing, after completion of the inflating process, due to an internal pressure within each respective chamber, wherein each of said plurality of chambers has a said filling opening interconnected with said supply channel via at least one channel branch, and each said at least one channel branch is located adjacent said first longitudinal seam and is configured so that each said at least one channel branch will sufficiently bend and crease, as said film bag is deformed during inflation, thereby creating a high flow resistance from the interior of each said chamber to the exterior environment.

2. An inflatable film bag according to claim 1, wherein each inflatable chamber further comprises a film strip connected to at least one of said first and second film portions by a further longitudinal seam to define, at least partially, each of said at least one channel branch between said film strip and one of said first and second film portions, and each said at least one channel branch communicates with said supply channel, via a feed opening, to facilitate flow of the medium from said supply channel, through said feed opening, into said at least one channel branch and through said filling opening into said chamber.

3. An inflatable bag according to claim 2, wherein each said at least one channel branch extends substantially in the longitudinal direction, for substantially the entire length of said chamber.

4. An inflatable film bag according to claim 1, wherein each of said plurality of chambers has a feed opening located substantially midway between the two opposed transverse seams partially defining each of said chamber, and two opposed filling openings communicating with said at least one channel branch are provided, and a said filling opening is located in each corner adjacent said first longitudinal seam and one of said two opposed transverse seam of each said chamber such that the filling medium flows from said supply channel, through said feed opening, into said at least one channel branch and then branches into two opposed longitudinal directions and flows through a said fill opening and into said chamber.

5. An inflatable bag according to claim 1, wherein each of said chambers has a feed opening located adjacent said first longitudinal seam and substantially in a first corner of each said chamber, and a filling opening in a second opposed corner of each said chamber adjacent said first longitudinal seam so that said filling medium flows substantially along the longitudinal direction in said channel branch from said feed opening to said fill opening.

6. An inflatable bag according to claim 1, wherein each of said chambers has two parallel longitudinally extending channel branches with each channel branch substantially extending the entire length of said chamber, said two channel branches are interconnected at one end by a U-shaped member adjacent said first longitudinal seam to form a U-shaped channel branch, a feed opening interconnects one end of one of said channel branches with said supply channel and said filling opening interconnects one end of the other of said channel branches with said chamber so that the medium flows along a U-shaped path from said feed opening to said fill opening.

7. An inflatable bag according to claim 1, wherein said at least one channel branch extends parallel to the longitudinal direction for substantially less than one half of the entire length of each said chamber so that said at least one channel branch is substantially located in a corner portion, of each of said chambers, where said feed opening is also located.

8. An inflatable bag according to claim 1, wherein each of said chambers has a plurality of parallel extending channel branches located substantially in a corner portion of each of said chambers where said feed opening is also located and said plurality of channel branches are interconnected end to end with one another to forming a serpentine path with said feed opening located at one end of the serpentine path and the filling opening located at the opposite end of the serpentine path.

9. An inflatable bag according to claim 1, wherein a plurality of feed openings are provided between said supply channel and said at least one channel branch of each of said chambers.

10. An inflatable bag according to claim 1, wherein said first longitudinal seam separates said supply channel from said plurality of the chambers so that said supply channel is located outside of said plurality of the chambers and said filling openings are formed at seam interruptions along said first longitudinal seam.

11. An inflatable bag according to claim 1, wherein at least one interrupted longitudinal seam is provided between said supply channel and said at least one channel branch.

12. An inflatable bag according to claim 1, wherein said at least one channel branch is located adjacent said first longitudinal seam, on the same side as said plurality of chambers, and said supply channel is located adjacent said channel branches on an opposite side of the first longitudinal seam.

13. An inflatable bag according to claim 1, wherein constrictions are provided in said at least one channel branch adjacent said filling opening.

14. An inflatable film bag according to claim 1, wherein said elongate first and second film portions are two separate films welded together by a second longitudinal seam.

15. An inflatable film bag according to claim 1, wherein said elongate first and second film portions are part of a single film which is folded over and the fold forms one of the longitudinal edges of said inflatable film bag.

16. An inflatable film bag according to claim 1, wherein said at least one channel branch is at least partially defined by at least one of said first and second film portions.

17. An inflatable film bag according to claim 1, wherein said supply channel is formed by the first longitudinal seam and a second adjacent longitudinal seam and at least one intermittent seam is provided therebetween.

18. An inflatable bag according to claim 1, wherein each of said chambers has two parallel longitudinally extending channel branches, said two channel branches are interconnected at one end by a U-shaped member adjacent said first longitudinal seam to form a U-shaped channel branch, a feed opening interconnects one of said channel branches with said supply channel and said filling opening interconnects the other of said channel branches with said chamber so that the medium flows along a U-shaped path from said feed opening to said fill opening.

19. An inflatable bag according to claim 1, wherein two parallel transverse seams separate each of said plurality of chambers from one another and said two parallel transverse seams facilitate bending of said inflatable bag without obstruction.

* * * * *